United States Patent [19]

Okumiya et al.

[11] 4,336,339

[45] Jun. 22, 1982

[54] HIGH ZIRCONIA FUSED REFRACTORY PRODUCT

[75] Inventors: Masataro Okumiya, Chigasaki; Kiyoharu Kuwabara, Yokohama, both of Japan

[73] Assignee: Asahi Glass Company Ltd., Tokyo, Japan

[21] Appl. No.: 237,258

[22] Filed: Feb. 23, 1981

[30] Foreign Application Priority Data

Mar. 18, 1980 [JP] Japan .................................. 55-34556

[51] Int. Cl.³ .......................................... C04B 35/48
[52] U.S. Cl. ................................. 501/103; 501/104; 501/105
[58] Field of Search .................. 106/57; 501/103, 105, 501/104

[56] References Cited

U.S. PATENT DOCUMENTS

| 3,132,953 | 5/1964 | Alper et al. | 106/57 |
| 3,519,448 | 7/1970 | Alper et al. | 106/57 |
| 3,632,359 | 1/1972 | Alper et al. | 106/57 |

FOREIGN PATENT DOCUMENTS 48-85610 11/1973 Japan.
53-121012 10/1978 Japan.

*Primary Examiner*—Mark Bell
*Attorney, Agent, or Firm*—Oblon, Fisher, Spivak, McClelland & Maier

[57] ABSTRACT

A high zirconia fused refractory product consists essentially of the following constituents analytically, on a weight basis:

85% to 97% of $ZrO_2$;
0.1% to 3% of $P_2O_5$;
2% to 10% of $SiO_2$;
up to 3% of $Al_2O_3$ without a substantial amount of a rare earth oxide.

7 Claims, No Drawings

HIGH ZIRCONIA FUSED REFRACTORY PRODUCT

BACKGROUND OF THE INVENTION

1. Field of the Invention:

The present invention relates to a fused refractory. More particularly, it relates to a high zirconia fused refractory product having high corrosion resistance which is especially suitable for a molten glass tank and furnace.

2. Description of the Prior Arts:

A fused refractory product has been usually obtained by casting a molten mixture of a specific composition of refractory materials which is completely melted in an electric furnace into a mold having a desired shape and annealing the molten composition to the ambient temperature to resolidify the composition. The fused refractory products have been well-known as high grade refractory products which are quite different from the fired or non-fired rebonded refractory products in view of the structure and the preparation.

The typical refractory products comprising $ZrO_2$ as a main component among such fused refractory products are $ZrO_2$—$Al_2O_3$—$SiO_2$ type refractory products. Certain high zirconia fused refractory products have been used.

The known $ZrO_2$—$Al_2O_3$—$SiO_2$ type refractory products usually have a content of $ZrO_2$ of about 33 to 40% by weight and have a structure containing baddeleyite ($ZrO_2$) and corundum ($Al_2O_3$) in a glassy matrix to have excellent resistance to a molten glass. In view of the content of $ZrO_2$, the corrosion resistance is limited.

On the other hand, a high zirconia fused refractory product consisting essentially of $ZrO_2$ crystal (baddeleyite) in the structure has been known but it has not been practically used, because the fused refractory product contains about 90% by weight of $ZrO_2$ and the abnormal expansion and contraction at about 1100° C. caused as the specific characteristic of $ZrO_2$ can not be easily prevented and block cast bricks having no crack are not easily obtained.

The cast refractory products containing about 90% by weight or more of $ZrO_2$ have been proposed in U.S. Pat. No. 3,519,448 and Japanese Unexamined Patent Publication No. 85610/1973 and No. 121012/1978. These refractory products have high corrosion resistance as high zirconia refractory products to be effective, however they have not been satisfactory in certain usages.

For example, the cast refractory products comprising on a weigh base; 50% to 98% of $ZrO_2$, 1% to 29% of $Al_2O_3$, 0.1% to 25% of $SiO_2$, 0.5% to 15% of a rare earth oxide, 0 to 6% of $P_2O_5$, 0 to 5% of an alkaline earth metal oxide and 0 to 4% of an alkali metal oxide have been disclosed in U.S. Pat. No. 3,519,448. In accordance with the proposal, the stabilization of $ZrO_2$ has been attained by the incorporation of the rare earth oxide in the high content of $ZrO_2$ as it is understood in view of the broad range of the content of $ZrO_2$ of 50 to 98%. As a result of various studies, it has been, however, found the fact that the incorporation of the rare earth component forms hard glassy component to cause cracks when the glass matrix component is less or nothing, whereas the rare earth component does not contribute for the stabilization for $ZrO_2$ by melting into the glass component when the glass matrix component is mush. If the rare earth component is much in view of contribution for the stabilization, the content of the glass matrix components is increased to deteriorate the corrosion resistance as high zirconia cast refractory product. In the high zirconia fused refractory product as the object product of the present invention, the rare earth component is not a desired component in view of said disadvantages and expensiveness of the component.

In Japanese Examined Patent No. 15689/1972, the object products having high content of $Al_2O_3$ have been proposed. The incorporation of the component of $Al_2O_3$ causes the hard glass matrix component. In the case of the high zirconia refractory product, the incorporation of much component of $Al_2O_3$ disadvantageously may cause cracks.

In Japanese Unexamined Patent Publication No. 85610/1973, the refractory products containing 90% to 98% of $ZrO_2$ have been proposed. As a matrix component, CuO or $B_2O_3$ has been incorporated whereby certain coloring of the glass product is caused by using the refractory product as the glass furnace. Therefore, the refractory product is not suitable to use it as the glass furnace for a glass product such as a soda lime type glass product which should not be colored.

In Japanese Unexamined Patent Publication No. 121012/1978, the refractory products containing 92% to 98% of $ZrO_2$ have been proposed. The products have not disadvantages of the cracks caused by the rare earth element, the lower corrosion resistance and the coloring of the glass product caused by the component of CuO which are found in the productions of Japanese Examined Patent Publication No. 15689/1972 and Japanese Unexamined Patent Publication No. 85610/1973, however the matrix consists of $SiO_2$, CaO and MgO to cause hard matrix glass phase. It is difficult to obtain a large cast block having no crack.

SUMMARY OF THE INVENTION

It is an object of the present invention to provide a high zirconia fused refractory product having excellent corrosion resistance which can be a cast product having no crack and which can be used as a refractory product for a molten glass without forming stones in a glass product nor coloring a glass product.

The foregoing and other objects of the present invention have been attained by providing a high zirconia fused refractory product consisting essentially of the following constituents analytically on a weight basis;

85% to 97% of $ZrO_2$;
0.1% to 3% of $P_2O_5$;
2% to 10% of $SiO_2$;
up to 3% of $Al_2O_3$ without a substantial amount of a rare earth oxide.

DETAILED DESCRIPTION OF THE PREFERRED EMBODIMENTS:

The fused refractory product of the present invention can be produced by melting completely a mixture of a zirconia source such as baddeleyite and a $P_2O_5$ source such as sodium phosphate in an electric furnace at high temperature such as about 2300° C. and casting the molten composition in a mold and annealing it.

In the melting of the mixture, the sources are precisely controlled so as to result the specific matrix composition which are important for the fused refractory product and an additive for improving meltability is incorporated if necessary.

The fused refractory product of the present invention should have precise analytical constituents in view of the following reason. The fused refractory product has a dense, uniform structure in which a small amount of a soft glass matrix composition containing the component of $P_2O_5$ as an important component is filled intergranule of baddeleyite crystals. In the preferred embodiment, the fused refractory product of the present invention has the following essential constitutions analytically on a weight basis:

|  | Broad range (%) | Preferred range (%) |
|---|---|---|
| $ZrO_2$ | 85-97 | 90-96 |
| $P_2O_5$ | 0.1-3 | 0.3-1 |
| $Al_2O_3$ | less than 3 | less than 1 |
| $SiO_2$ | 2-10 | 3-6 |
| $Na_2O(R_2O)$ | less than 1 | less than 0.6 |
| Alkaline earth metal oxide (RO) + $Fe_2O_3$ + $TiO_2$ | less than 1 | less than 0.5 (0.1) |
| Rare earth oxide | less than 0.5 | less than 0.1 |

The reasons for the limitations will be illustrated.

When the component of $ZrO_2$ is too much, it is difficult to obtain a block cast product having no crack with a small amount of a glass matrix composition even though the component of $P_2O_5$ is incorporated, whereas when it is too small, the desired high corrosion resistance can not be imparted.

The zirconia source can be silica reduced cullet obtained from zircon and also can be baddeleyite and artificial zirconia though it is high cost.

The component of $P_2O_5$ is effective for forming a soft glass matrix as the glass matrix composition, whereby a cast product having no crack can be obtained even though the amount of the glass composition is small and the cast product can be used as refractory product for a glass melting furnace without forming stones in a glass product nor coloring a glass product. The component of $P_2O_5$ imparts easy melting to attain the advantage of saving electric power energy.

When the content of $P_2O_5$ is too much, high corrosion resistance as the high zirconia refractory product is not satisfactorily imparted whereas when it is too less, the desired improvement of the glass matrix is not attained.

Phosphorus component is usually incorporated as $P_2O_5$ in the glass matrix of the cast product. The content of phosphorus component is shown as $P_2O_5$.

The $P_2O_5$ sources can be sodium phosphate and aluminum phosphate. It is also possible to incorporate it as $P_2O_5$ or the other compound or mineral in view of a glass matrix composition. The component of $P_2O_5$ improves the glass matrix composition as the component in the cast product. On the other hand, the component of $P_2O_5$ is also effective for meltability of the sources in view of the production. It is also effective to incorporate the component of $P_2O_5$ at a ratio of more than 3% for this purpose. The component of $P_2O_5$ is usually lost at certain rate by the volatilization in the melting step and accordingly, it is preferable to incorporate more than 0.5% of the component of $P_2O_5$ in the sources.

It is necessary to incorporate at least 2% of the component of $SiO_2$ as the basical component for the glass matrix composition whereas when the component of $SiO_2$ is too much, the corrosion resistance is inferior.

The component of $Al_2O_3$ is the component for the glass matrix composition in the fused refractory product. When it is too much, the glass matrix is hardened to cause crack. Although crack caused by the component of $Al_2O_3$ can be prevented by increasing the ratio of the glass composition, the merit of high corrosion resistance of high zirconia product is not imparted. Thus, it is necessary to limit the content of $Al_2O_3$ to less than 3% preferably less than 1%. It is possible to obtain a block cast product having no crack without limiting the ratio of $Al_2O_3/SiO_2$ to less than 0.5 by the effect of the component of $P_2O_5$ though it has been required in Japanese Unexamined Patent Publication No. 85610/1973.

The components other than $ZrO_2$, $P_2O_5$, $Al_2O_3$ and $SiO_2$ which can be incorporated in the product of the present invention are the components of $Na_2O$ and $K_2O$. It is preferable to minimize these components because the corrosion resistance is inferior when it is too much. The other impurities may be the components of $Fe_2O_3$, $TiO_2$, MgO and CaO. These components cause hard glass matrix. Thus, it is preferable to minimize these impurities usually less than 1% preferably less than 0.5% especially less than 0.1%.

The rare earth oxides also cause hard glass matrix to loss the effect of the glass matrix resulted by the incorporation of the component of $P_2O_5$. Thus, it is preferable to minimize the rare earth oxide to less than 0.5% especially less than 0.1%.

In accordance with the fused refractory product of the present invention, it is possible to provide a cast product having no crack which has more than 2 times of corrosion resistance to a molten glass in comparison with the conventional $ZrO_2$—$Al_2O_3$—$SiO_2$ type cast product having about 40% of $ZrO_2$. The fused refractory product can be effectively used as the refractory product for high corrosion resistance such as a throat part of a glass melting furnace which is used in the severest condition, without forming stones in a glass product nor coloring a glass product. The industrial value is remarkably high.

The product of the present invention has been found in the study for producing a block cast product having no crack in view of the development. Thus, it is possible to pulverize the product so as to use it as a powder for a rebonded refractory product.

The present invention will be further illustrated by certain examples and references which are provided for purposes of illustration only.

EXAMPLES:

The analytical results of the sources used for the examples are as follows:

| Baddeleyite: | 98% $ZrO_2$; 0.6% FeO; 0.5% $TiO_2$ |
|---|---|
| Silica reduced zirconia: | 94.3% $ZrO_2$; 4.5% $SiO_2$ |
| Sodium phosphate: | $(NaPO_3)_n$ (69.6% $P_2O_5$; 30.4% $Na_2O$) |
| Aluminum phosphate: | $AlPO_4$ (58.2% $P_2O_5$; 41.8% $AlO_3$) |
| Bayer alumina: | 99.3% $Al_2O_3$; 0.6% $Na_2O$ |
| Soda ash: | 58.5% $Na_2O$ |
| Silica: | 99.0% $SiO_2$ |
| Bastnesite: | 68-75% rare earth oxides; 5-6% of F; small amounts of $SiO_2$, $P_2O_5$, $Fe_2O_3$ and CaO |

Each batch mixture of the sources was charged in a 200 KV single phase arc electric furnace to completely melt the mixture at a temperature of about 2200° to 2300° C. The molten composition was casted in a graphite mole surrounded by Bayer alumina having inner space of 160 mm×200 mm×350 mm (height) and annealed to the room temperature.

The analytical results of the resulting cast products are shown in Table 1 and the characteristics of the cast products are shown in Table 2. (The samples $P_1$–$P_{10}$ show as the references.)

TABLE 1

|  | $P_1$ | $P_2$ | $P_3$ | $P_4$ | $P_5$ | $P_6$ | $P_7$ | $P_8$ | $P_9$ |
|---|---|---|---|---|---|---|---|---|---|
| $ZrO_2$ | 41 | 70 | 90 | 95.0 | 90 | 90 | 92 | 95.5 | 87 |
| $P_2O_5$ | — | <0.1 | 1.5 | 0 | 0.5 | 4.0 | 1 | 0 | 0.2 |
| $Al_2O_3$ | 46 | 18 | 2.5 | 1.5 | 5 | 1.0 | 2 | 1.2 | 1.5 |
| $SiO_2$ | 12 | <0.3 | 5 | 3.0 | 3.5 | 4.0 | 2.5 | 3.0 | 10.9 |
| $Na_2O$ | 0.8 | — | 0.5 | 0.3 | 0.3 | 0.5 | 0.5 | 0.2 | 0.3 |
| $Fe_2O_3$ | <0.1 | <0.5 | <0.5 | 0.2 | <0.5 | <0.5 | 1.6 | <0.1 | <0.1 |
| $TiO_2$ | | | | | | | | | |
| $MgO$ | <0.1 | <0.1 | <0.1 | | <0.1 | <0.1 | | | |
| $CaO$ | | | | | | | | | |
| rare earth oxide | — | 10.1 | 0.9 | — | — | — | — | — | — |

|  | $P_{10}$ | $S_1$ | $S_2$ | $S_3$ | $S_4$ | $S_5$ | $S_6$ | $S_7$ | $S_8$ |
|---|---|---|---|---|---|---|---|---|---|
| $ZrO_2$ | 93.6 | 88.5 | 94.5 | 94.0 | 93.5 | 93.8 | 93.6 | 94.5 | 96.9 |
| $P_2O_5$ | 0.2 | 0.8 | 0.2 | 1.5 | 0.6 | 0.5 | 1.7 | 0.3 | 0.2 |
| $Al_2O_3$ | 1.3 | 2.5 | 0.4 | 0.5 | 2.0 | 1.5 | 0.5 | 2.0 | 0.4 |
| $SiO_2$ | 3.3 | 7 | 4.5 | 3.5 | 3.5 | 3.8 | 3.8 | 2.5 | 2.1 |
| $Na_2O$ | 1.5 | 1.0 | 0.3 | 0.3 | 0.2 | 0.8 | 0.3 | 0.2 | 0.3 |
| $Fe_2O_3$ | | | | | | | | | |
| $TiO_2$ | <0.1 | <0.5 | <0.1 | <0.1 | <0.1 | <0.1 | <0.1 | <0.1 | <0.1 |
| $MgO$ | | | | | | | | | |
| $CaO$ | | | | | | | | | |
| rare earth oxide | — | — | — | — | — | — | — | — | — |

TABLE 2

|  | $P_1$ | $P_2$ | $P_3$ | $P_4$ | $P_5$ | $P_6$ |
|---|---|---|---|---|---|---|
| crack | none | large cracks | cracks | cracks | large cracks | none |
| bulk density | 4.00 | 4.15 | 4.20 | 4.23 | 4.28 | 4.26 |
| compressive strength (kg/cm²) | 3500 | — | — | — | — | — |
| corrosion resistance*1 | 1.0 | 1.25 | 1.35 | 2.20 | 1.7 | 1.7 |
| effect for molten glass*2 |  |  |  |  |  |  |
| coloring | none | slight | none | none | none | none |
| stone formation | stones | stones | none | none | none | none |

|  | $P_7$ | $P_8$ | $P_9$ | $P_{10}$ | $S_1$ | $S_2$ |
|---|---|---|---|---|---|---|
| crack | large cracks | large cracks | none | none | none | none |
| bulk density | 4.30 | 4.35 | 4.18 | 4.32 | 4.25 | 4.36 |
| compressive strength (kg/cm²) | — | — | — | — | 4000 | — |
| corrosion resistance*1 | 1.35 | 2.20 | 1.40 | 1.45 | 1.85 | 2.25 |
| effect for molten glass*2 |  |  |  |  |  |  |
| coloring | colored | none | none | none | none | none |
| stone formation | stones | none | none | none | none | none |

|  | $S_3$ | $S_4$ | $S_5$ | $S_6$ | $S_7$ | $S_8$ |
|---|---|---|---|---|---|---|
| cracks | none | none | none | none | none | none |
| bulk density | 4.35 | 4.33 | 4.32 | 4.33 | 4.31 | 4.32 |
| compressive strength (kg/cm²) | 4300 | — | — | 3800 | — | — |
| corrosion resistance*1 | 2.20 | 2.00 | 2.10 | 2.05 | 1.90 | 2.00 |
| effect for molten glass*2 |  |  |  |  |  |  |
| coloring stone | none | none | none | none | none | none |
| formation | none | none | none | none | none | none |

Note:
*1corrosion resistance:

*2The effect to the molten glass was tested by observing the coloring of the glass and the formation of stones in the glass remained in the platinum crucible after the corrosion test.

Each rectangular sample (15 mm×15 mm×50 mm) was cut out from each cast product and was suspended in a platinum crucible and heated in a siliconite electric furnace at 1500° C. for 48 hours to measure corroded thickness. Soda-lime glass was used as the corrosion agent. The corroded thickness at slug line was measured by slide calipers and the corrosion resistant index was calculated as follows.

$$\text{Corrosion resistant index} = \frac{\text{corroded thickness of } P_1 \text{ (mm)}}{\text{corroded thickness of sample (mm)}}$$

We claim:
1. A high zirconia fused refractory product consisting essentially of the following constituents analytically, on a weight basis:
85% to 97% of $ZrO_2$;
0.1% to 3% of $P_2O_5$;
2% to 10% of $SiO_2$;
up to 3% of $Al_2O_3$; and
being full of rare earth oxide.
2. The high zirconia fused refractory product according to claim 1 wherein the content of $Al_2O_3$ is less than 1% by weight.
3. The high zirconia fused refractory product according to claim 1 or 2, wherein a content of an impurity beside $ZrO_2$, $P_2O_5$, $Al_2O_3$, $SiO_2$ and $Na_2O$ is less than 1% by weight.
4. The high zirconia fused refractory product according to claim 3 wherein a content of the impurity is less than 0.5% by weight.

5. The high zirconia fused refractory product according to claim 4 wherein a content of the impurity is less than 0.1% by weight.

6. A high zirconia fused refractory product consisting essentially of the following constituents analytically, on a weight basis:
   85% to 97% of $ZrO_2$;
   0.1% to 3% of $P_2O_5$;
   2% to 10% of $SiO_2$;
   up to 3% of $Al_2O_3$;
less than 1% of alkali metal oxide and being free of rare earth oxide.

7. A high zirconia fused refractory product consisting essentially of the following constituents analytically, on a weight basis:
   90% to 96% of $ZrO_2$;
   0.1% to 3% of $P_2O_5$;
   3% to 6% of $SiO_2$;
   less than 1% of $Al_2O_3$;
   less than 0.6% of alkali metal oxide;
   less than 0.5% of alkaline earth metal oxide + $Fe_2O_3$ + $TiO_2$; and
being free of rare earth oxide.

* * * * *